United States Patent [19]
Rivero

[11] Patent Number: 4,638,595
[45] Date of Patent: Jan. 27, 1987

[54] PLANT TRANSPORTING DEVICE

[76] Inventor: Mauricio Rivero, 3411 SW. 16 Ter., Miami, Fla. 33145

[21] Appl. No.: 708,540

[22] Filed: Mar. 5, 1985

Related U.S. Application Data

[63] Continuation-in-part of Ser. No. 453,580, Aug. 11, 1983, abandoned.

[51] Int. Cl.$^4$ .............................................. A47G 7/00
[52] U.S. Cl. ....................................... 47/39; D6/403; 47/72
[58] Field of Search .................... 47/39, 72, 41–41.13, 47/66; 248/129, 27.8; D6/403

[56] References Cited

U.S. PATENT DOCUMENTS

| | | | |
|---|---|---|---|
| 396,459 | 1/1889 | Bertrand | 47/39 |
| 489,745 | 1/1893 | Jewinall et al. | 248/129 X |
| 585,931 | 7/1897 | Gridley | 47/39 |
| 1,371,796 | 3/1921 | Loudon | 47/39 X |
| 1,820,843 | 8/1931 | Spitz | 47/39 |
| 2,136,279 | 11/1938 | DeVilbiss | 47/39 X |
| 2,274,979 | 3/1942 | Frenette | 47/39 |
| 2,707,351 | 5/1955 | Walker | 47/39 |
| 2,861,764 | 11/1958 | Fisher | 47/39 X |
| 4,300,312 | 11/1981 | Weder et al. | 47/72 |

Primary Examiner—Robert A. Hafer
Assistant Examiner—Danton DeMille
Attorney, Agent, or Firm—Jesus Sanchelima

[57] ABSTRACT

A device for transporting plants in their pots having a wheeled frame on which a support bracket member is mounted providing support for a base member that is spaced apart a sufficient vertical distance upwardly to form a compartment where a removable water reservoir is housed. The base has several upwardly extending members rigidly mounted on its periphery exerting an inwardly tension force on the pots being transported or resting thereon so that the pots are kept in place during their transportation. A telescopically extending handle is concealed within the device.

4 Claims, 3 Drawing Figures

PLANT TRANSPORTING DEVICE

BACKGROUND OF THE INVENTION

1. Other related applications

The present application is a continuation-in-part of application Ser. No. 453,580 filed on Aug. 11, 1983, now abandoned.

2. Field of the Invention

The present invention relates to devices for facilitating the maintenance of plants, and more particularly, to those devices for transporting the plant and providing water storage and drainage.

3. Description of the prior art

It is common to move plants around a house to change the aesthetic appearance of the dwelling or to rotate plants from places where they can receive sunlight, or for any other purpose.

The closest prior art, to the best of applicant's knowledge, corresponds to the Flower Pot Support disclosed in U.S. Pat. No. 585,931 issued to W. D. Gridley in 1897. This bulky, heavy and complicated device requires a rather unusual screw to keep pot A in place. It is unlikely that this apparatus would find a place in the modern home. The present invention meets the plant transportation need mentioned above in an efficient and appealing device.

The all metal apparatus disclosed in U.S. Pat. No. 2,274,979 issued to Edward B. Frenette was cited by the Examiner in the parent application to show a hidden handle. This sturdy receptacle does not provide the function of the present invention or in any way suggests any of its characteristics other than the above mentioned feature.

Other patents describing the closest subject matter provide for a number of more or less complicated features that fail to solve the problem in an efficient and economical way. None of these patents suggest the novel features of the present invention.

SUMMARY OF THE INVENTION

It is the main purpose of the present invention to provide a device for transporting a plant in its pot easily.

It is another purpose of the present invention to provide a device that provides a water drainage and storage compartment.

It is yet another purpose of the present invention to provide such a device that is inexpensive to manufacture and maintain.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
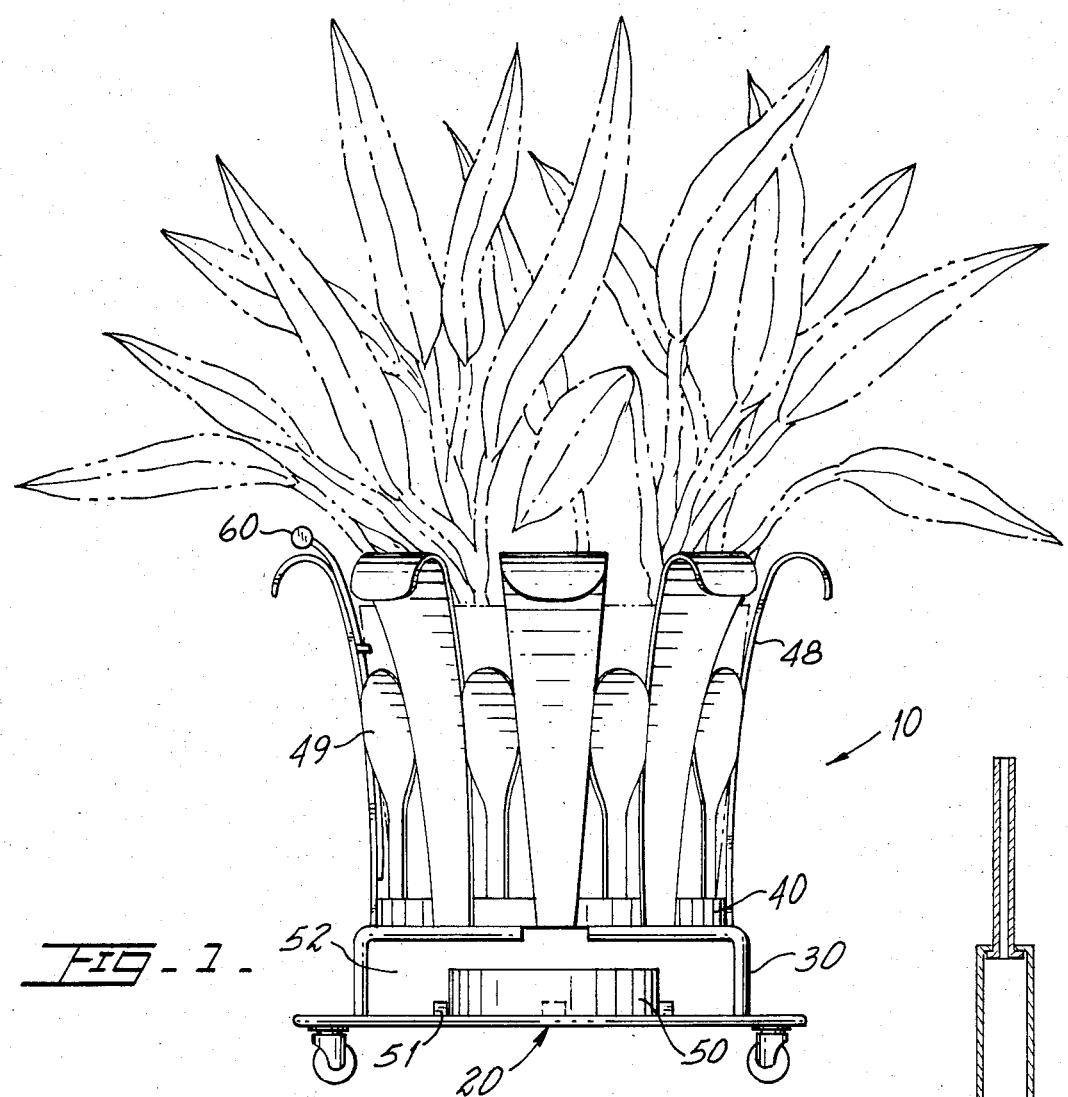
FIG. 1 represents a side view of the present invention.
Figure 1A:
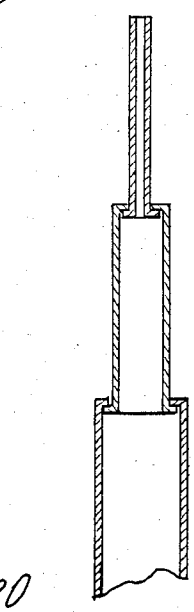
FIG. 1A is a partial cross-section of the telescopically extendible handle.
Figure 2:
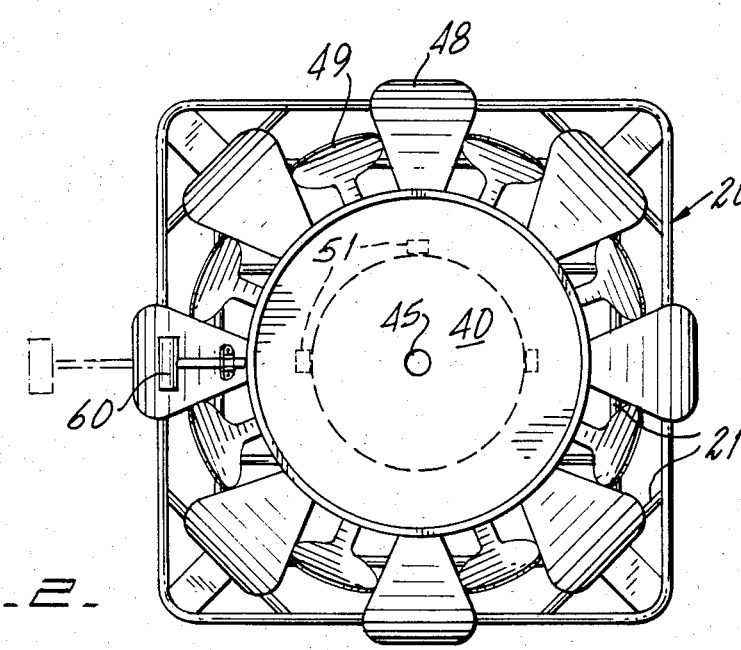
FIG. 2 shows a top view of the present invention.

Referring now to FIG. 1, where the present invention is generally referred to with numeral 10, it can be observed that it comprises, primarily, of wheeled frame or platform 20, support brackets 30 mounted above platform 20 elevating base 40 above frame 20. The elevation is enough to allow a removable water reservoir 50 to be positioned between frame 20 and base 40. The space or compartment 52 defined by frame 20, base 40 and support bracket 30 may be covered so that reservoir 50 is not seen from the outside. A small hinged wall (not shown) on one of the sides of compartment 52 may be provided for insertion and removal of reservoir 50. Frame 20 may be a frame, as is the preferred embodiment, of rectangular or square shape with reinforcement members 21 interconnecting its sides and themselves so that reservoir 50 may be supported by members 21. Frame 20 may also be a solid platform but this increases its weight, and possibly its cost unnecessarily. Support brackets 30, in the preferred embodiment, are made out of a rigid material with an L-shape and welded to frame 20 and base 40. Base 40 is provided with drainage hole 45 that is positioned to correspond with reservoir 50. In the preferred embodiment, reservoir 50 has the physical structure of a pan. A plant pot (shown in phantom in FIG. 1) may then be positioned on base 40 so that the conventional drainage hole in the pot coincides with drainage hole 45. Reservoir 50 prevents water from falling on the floor and also provides readily accessible water to be used again on the plant. Guiding or stopper members 51 localize the position where reservoir 50 is to be positioned.

Several upwardly extending rigid petal members 48 are provided with sufficient elastic capabilities to urge themselves inwardly when a plant pot of suitable size is pushed, slightly, downwardly in a tight fit. This makes an easily and readily available mechanism for keeping the plant pots in place. Petal members 48 are mounted (welded) on the periphery of base member 40 and the shape of these members 48 may vary. In the preferred embodiment an aesthetically appealing design of petals or leaves was chosen. To further strengthen petal members 48 in their upright position, connecting members 49 are also mounted (welded) on the periphery of base member 40. Members 49 are connected (welded) to approximately the middle portion of the edges of petal members 48 in order to further strengthen members 48 and insure its elastic recovery or inwardly directed force.

The present invention is easy to move so that even older persons may utilize it. Once the pot has been properly positioned in device 10, it can be moved around in any direction since the wheels of wheeled frame 20 allow it to go in any direction.

A telescopically extending handle 60 is mounted on the upper section of the inside wall of one of the petal members 48. This concealed handle 60 may be pulled out to facilitate the transportation of device 10.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A device for transporting plants in their pots, comprising:
   A. a wheeled frame;
   B. support bracket means mounted on said frame;
   C. a base member mounted on said support bracket means in a spaced apart relationship with respect to said frame thereby forming a compartment and said base member further including a drainage hole;
   D. a plurality of upwardly extending first rigid members attached to the periphery of said base member, said rigid members biased inwardly providing a flexible enclosure to keep said pots in place during transportation;
   E. reservoir means positioned within said compartment so that it may collect the excess water dripping from said drainage hole;
   F. a plurality of upwardly extending second rigid members alternatively arranged between said first rigid members being smaller size, and said first and second rigid members being mechanically connected between adjoining members so that further structural integrity is provided insuring the availability of said sufficient tension; and
   G. telescopic handle means for pulling said device, said handle means being concealed within said device and having a plurality of tubular members that can be housed within each other so that said handle means may be concealed.

2. The device set forth in claim 1, wherein said frame has a substantially rectangular shape and includes a plurality of interconnecting rigid members that provide mechanical integrity to said frame.

3. The device set forth in claim 2, wherein said compartment is covered by non-transparent material thereby concealing said reservoir means.

4. The device set forth in claim 3 wherein said frame includes a plurality of guiding elements to secure said reservoir means in place within said compartment.

* * * * *